United States Patent [19]

Samuels

[11] 4,321,724
[45] Mar. 30, 1982

[54] SNOW REMOVAL DEVICE FOR VEHICLES

[76] Inventor: James C. Samuels, 324 Pinecrest Rd., Springfield, Pa. 19064

[21] Appl. No.: 194,877

[22] Filed: Oct. 7, 1980

[51] Int. Cl.³ .............................................. B60S 3/04
[52] U.S. Cl. ........................................ 15/245; 15/105
[58] Field of Search .................... 15/105, 210 R, 228, 15/236 R, 245, 159 R, 160 R, 393, 398, 399, 400, 401

[56] References Cited

U.S. PATENT DOCUMENTS

| | | | |
|---|---|---|---|
| 1,591,080 | 7/1926 | Cole et al. | 15/228 |
| 2,489,483 | 11/1949 | Czapar, Jr. | 15/245 |
| 3,091,791 | 6/1963 | Czapar, Jr. | 15/245 |

Primary Examiner—Edward L. Roberts
Attorney, Agent, or Firm—B. P. Fishburne, Jr.

[57] ABSTRACT

To facilitate the removal of heavy accumulations of snow from vehicle surfaces, a roughly triangular sweeping head is secured to a manipulating handle and can be reciprocated along the axis of the handle or swung from side-to-side in a wide sweeping arc. Rubber-like blades attached to the three sides of the sweeping head include tapered edges projecting equidistantly beyond the plane in which the sweeping head and handle are located, thereby rendering the device reversible. The construction of the device is such that damage to the finish of the vehicle by its use is precluded. Very little physical effort is required to completely remove large deposits of snow by means of the device.

6 Claims, 5 Drawing Figures

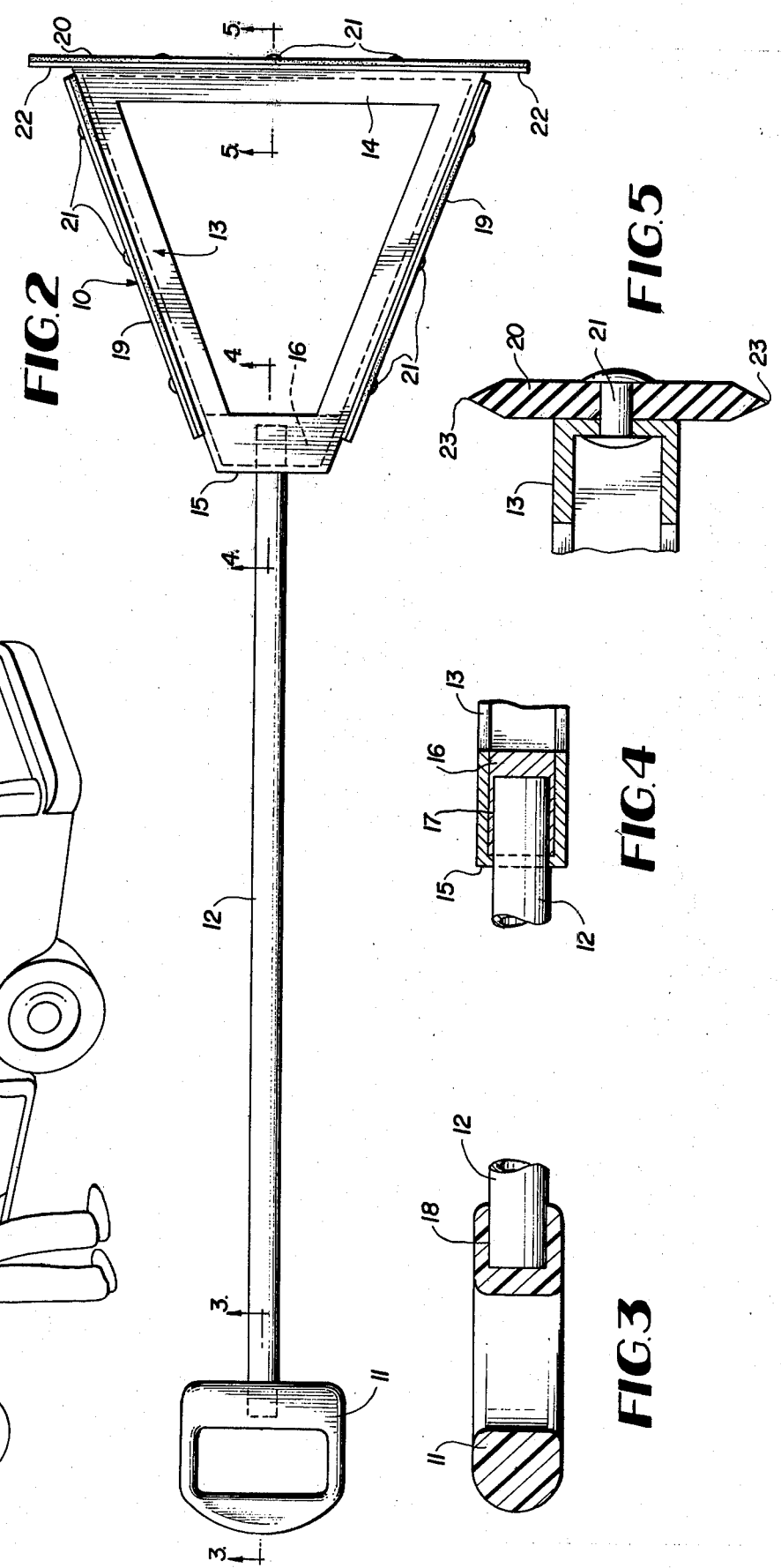

SNOW REMOVAL DEVICE FOR VEHICLES

BACKGROUND OF THE INVENTION

A drastic need exists for a convenient and efficient implement to facilitate removal of heavy snow deposits from the glass and metal surfaces of automotive vehicles. This need has not been satisfied in the prior art, and it is the object of the invention to provide a snow removal device for vehicles which will completely satisfy the need in a very economical manner.

Efficient devices, such as hand scrapers, are available on the market for scraping ice and shallow deposits of snow from windshields and other glass surfaces. These devices are not suitable for removing heavy snow deposits, however. Customarily, the frustrated motorist will resort to the kitchen broom and sometimes to a snow shovel which can seriously damage the vehicle finish and is not convenient to use. In the case of a broom, the same is not designed for the required snow removal operation and therefore does an inadequate job. Furthermore, the snow removal operation soaks and usually damages the broom.

In the description to follow, it will be seen that the snow removal device forming the invention is ideally suited to its intended use, is very convenient and easy to use, is lightweight, economical to manufacture, and cannot damage the vehicle. The rubber-like blades act on the glass and metal surfaces as a squeegee to clean them thoroughly.

Other features and advantages of the invention will appear hereinafter.

BRIEF DESCRIPTION OF THE DRAWINGS

FIG. 1 is a perspective view of a snow removal device according to the invention depicting its use.

FIG. 2 is a plan view of the device.

FIG. 3 is an enlarged vertical section taken on line 3—3 of FIG. 2.

FIG. 4 is a similar section taken on line 4—4 of FIG. 2.

FIG. 5 is a similar section taken on line 5—5 of FIG. 2.

DETAILED DESCRIPTION

Referring to the drawings in detail wherein like numerals designate like parts, a snow removal device or implement particularly for vehicles comprises a roughly triangular snow sweeping head 10 and an attached handle 11 having an elongated shank 12. While dimensions are not critical and can be varied somewhat, the overall length of the device may be about 22 inches and its width across the front of the sweeping head 10 may be about 12 inches.

The sweeping head 10 comprises a preferably aluminum roughly triangular frame 13 of channel cross section, as best shown in FIG. 5. The two side members of the frame 13 which converge toward the handle 11 are in a common plane with the handle shank 12 and symmetrically disposed relative to the axis of the handle shank. These two side members form with the forward cross member 14 of the frame 13 an approximate isosceles triangle whose apex toward the handle 11 is truncated, as indicated at 15. Within the truncated portion 15 of frame 13, FIG. 4, is a suitable block 16 forming an anchor for the leading end of handle shank 12, the block having a socket recess 17 snugly receiving the handle shank. The rear end of the shank 12 is similarly socketed at 18 into the handle 11, FIG. 3.

The entire device as thus far described may be formed of aluminum for the sake of lightness, durability and economy. In some cases, the frame 13 alone may be aluminum and the block 16 and/or handle and shank may be wood or plastics. In other cases, the entire structure described thus far could be formed of plastics material.

On the exterior flat faces of the two converging sides and forward cross member of the triangular frame 13 are blades 19 and 20 of rubber or rubber-like material. These blades are secured to the frame 13 by rivets 21. The blades 19 and 20 are of equal thickness, preferably at least one-quarter inch thick, and of equal widths, preferably 2¼ to 2½ inches wide. The frontal blade 20 is somewhat longer than the two side blades 19, whereby end portions 22 of the frontal blade extend outwardly somewhat on opposite sides of the sweeping head 10 at its forward end. The blades 19 and 20 also project equidistantly above and below the plane of the sweeping head 10, FIG. 5, and the opposite longitudinal edges of each blade are beveled to knife-like squeegee edges 23. Since these edges are symmetrical about the common plane through the head 10 and shank 12, the device is freely reversible during use. That is, with reference to FIG. 1, the device can be inverted 180 degrees from its position shown in FIG. 1 and either edge 23 of the blades can be employed. The user need not be concerned about which side of the device is up or down during use, which is a further convenience factor. The blades 19 and 20, while relatively stiff, are somewhat yielding and therefore will not damage the automobile finish or scratch the glass.

As shown in FIG. 1, the device may be reciprocated along the axis of the shank 12 to remove wide areas of deep snow from the roof, hood, windshield or other glass areas of the vehicle. The sweeping head 10 may also be swung laterally in a wide arc as shown by the arrows in FIG. 1 to bring the side blades 19 into play in order to more rapidly clean wide areas of the roof or other surfaces. The size of the implement is such that one or two strokes across a windshield or rear or side window of an automobile will clear it completely of snow. Furthermore, the user does not soil his clothes by leaning and stretching across the hood of the car as is necessary when using the known prior art scrapers and snow cleaning devices. It is thought that the many advantages of the invention will now be apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A device for removing snow from surfaces of vehicles comprising a roughly triangular sweeping head including rearwardly converging sides and a forward transverse end, a manipulating handle attached to the rear of the sweeping head, and blades of rubber-like material secured to said converging sides and forward transverse end of said head and having longitudinal cleaning edges projecting above and below top and bottom surfaces of said head.

2. A device for removing snow from surfaces of vehicles as defined in claim 1, and said head comprising a roughly triangular frame having flat exterior side and frontal surfaces, and said blades mounted on and substantially covering said surfaces, said cleaning edges of the blades being beveled.

3. A device for removing snow from surfaces of vehicles as defined in claim 2, and spaced rivets attaching said blades to said exterior side and frontal surfaces.

4. A device for removing snow from surfaces of vehicles as defined in claim 2, and said frame having a channel cross section with the open side of the channel disposed inwardly around the perimeter of the frame.

5. A device for removing snow from surfaces of vehicles as defined in claim 1, and the blades secured to the converging sides having equal lengths and being substantially coextensive lengthwise with the converging sides, the blade secured to said forward transverse end being longer than such end and including end portions projecting freely beyond opposite frontal corners of the sweeping head and beyond the frontal ends of the blades secured to the converging sides.

6. A device for removing snow from surfaces of vehicles comprising a forward snow sweeping head including a forward transverse edge and two side edges converging rearwardly from said forward edge of the head, a manipulating handle for the device attached to the rear of said head, and rubber-like cleaning blades attached to and substantially covering said forward transverse and side edges, said blades having longitudinal cleaning edges disposed in two planes above and below and substantially parallel with planes defined by the opposite major surfaces of the sweeping head.

* * * * *